UNITED STATES PATENT OFFICE.

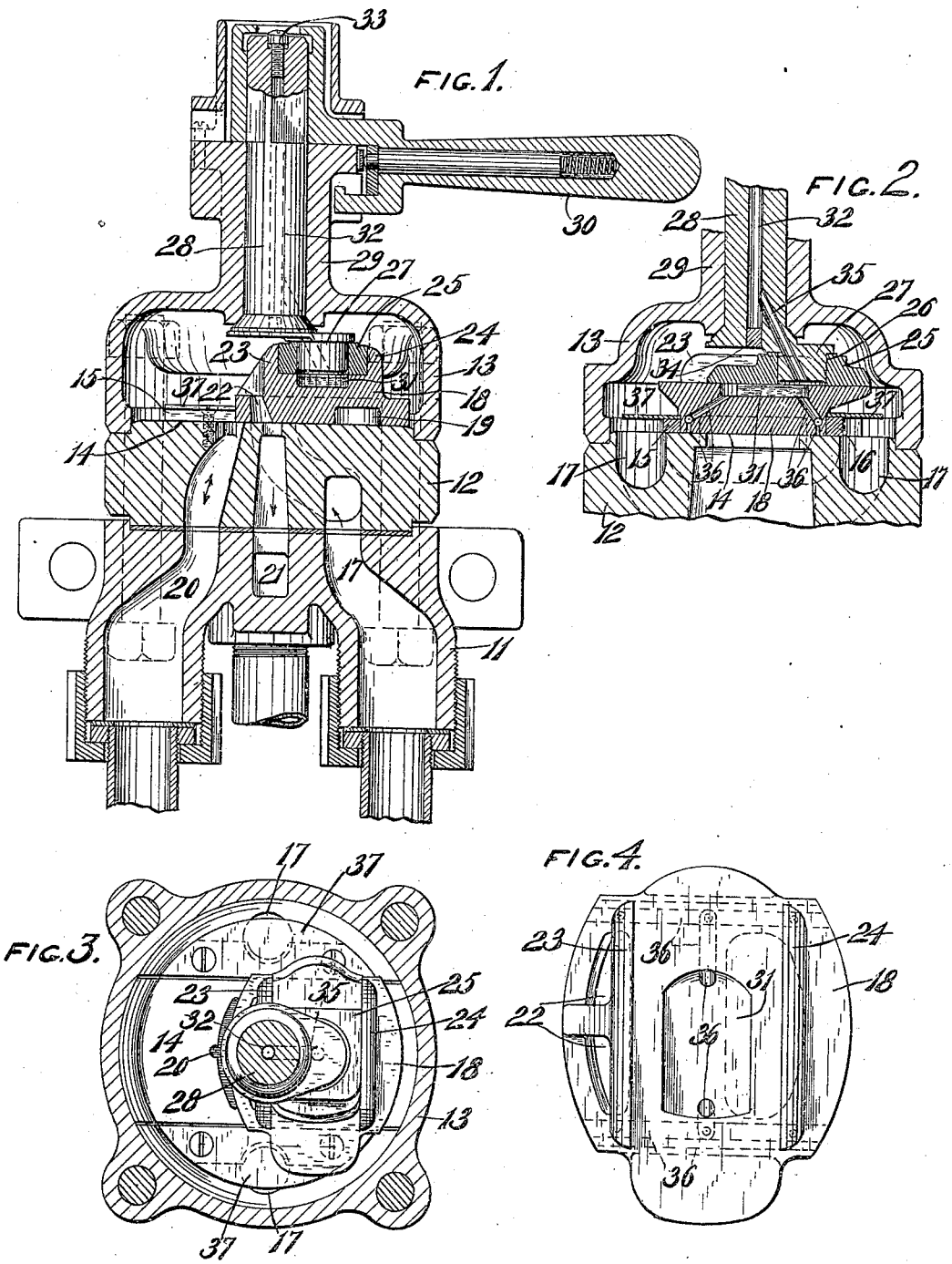

WALTER J. RICHARDS, OF MILWAUKEE, WISCONSIN, ASSIGNOR TO NATIONAL BRAKE & ELECTRIC COMPANY, OF MILWAUKEE, WISCONSIN, A CORPORATION OF WISCONSIN.

VALVE-OILING DEVICE.

952,580.

Specification of Letters Patent.    Patented Mar. 22, 1910.

Application filed December 18, 1909. Serial No. 533,924.

*To all whom it may concern:*

Be it known that I, WALTER J. RICHARDS, residing in Milwaukee, in the county of Milwaukee and State of Wisconsin, have invented new and useful Improvements in Valve-Oiling Devices, of which the following is a description, reference being had to the accompanying drawings, which are a part of this specification.

This invention relates to valve mechanism, and its object is to provide improved oiling means for valves, particularly engineers' valves or the like.

In engineers' valves there is usually employed a slide valve reciprocating over a valve seat in one direction and a slide block and other members connecting the valve with a valve stem to cause the reciprocation of the valve upon rotation of the valve stem. In these devices the friction between the slide valve and seat is considerable, as the valve is subjected to compressed air in the valve chamber, and various means for lubricating the valve parts to prevent wear resulting from such friction have been proposed but have not been successful for the reason that in all of these devices the oil is drawn and blown away from the engaging surfaces by the compressed air leaving the valve chamber.

The present invention overcomes the defects of former lubricating devices by providing an inclosed oil well in the valve with passageways leading to the bearing surfaces, the closure for the oil well preventing access of the pressure fluid within the valve chamber thereto and thus avoiding a forcible discharge of the oil therefrom.

Although the present invention may be applied to valves of different constructions, it was particularly designed as an improvement upon the valve oiling device covered by Letters Patent No. 836,461, to Bert Aikman, dated May 5, 1908, and is therefore illustrated in the accompanying drawings in conjunction with the valve shown in such Letters Patent.

Figure 1 is a sectional view of a valve showing the various valve operative parts and my improved oiling device; Fig. 2 is a similar view of a fragment thereof on a plane at right angles to the sectional plane of Fig. 1, the valve stem having been moved to remain in the same relative position to the figure; Fig. 3 is a plan view with the bonnet and stem sectioned to show the valve parts; and, Fig. 4 is an enlarged plan view of the slide valve alone.

In this engineers' valve, the frame comprises the base 11, seat 12 and the bonnet 13 suitably secured together in any manner. Mounted on the valve seat at the sides of the slide surface 14 are parallel guide strips 15 and 16 which form guides for the slide valve and which are notched as usual to avoid covering the ends of the forked compressed air supply passageway 17. The slide valve 18 at its base rests upon the slide surface 14 and the parallel sides thereof engage the guide strips 15 and 16 respectively. In this base portion of the slide valve is formed the valve pocket 19 for controlling the connection of the ports of the brake pipe passageway 20 and the exhaust passageway 21 and through such base portion passes the opening 22 for connecting the valve ports with the valve chamber within the bonnet.

Extending upwardly from the slide valve are parallel guide flanges 23 and 24 which are at right angles to the guide strips 15 and 16 on the valve seat. Seated on the plain upper surface of the slide valve between the guide flanges 23 and 24 is a slide block 25 having an opening 26 in which engages the crank pin 27 at the end of the crank arm of the valve stem 28 extending upwardly through the neck 29 of the bonnet and terminating in the polygonal end adapted for engagement with a handle 30 whereby the stem may be turned. Owing to the eccentric position of the crank pin 27 with respect to the stem 28 the turning of the stem causes reciprocation of the block 25 across the slide valve between the guide flanges 23 and 24, such movement also causing reciprocation of the slide valve across the valve seat between the guide strips 15 and 16.

In the top of the slide valve a depression or recess 31 is formed constituting a well which may be filled with oil in any manner, preferably through a drilled hole or passageway 32 through the valve stem with the upper end hermetically sealed by a screw 33 and the lower end sealed by a plug 34, there being a branch passageway 35 leading from passageway 32 near its lower end through the crank arm and pin 27 to the oil well 31 therebeneath. To lead the oil from the well 31 to the bearing surfaces, small openings or passageways 36 are drilled through the valve at its sides, as best shown in Fig. 2, and thus, as the valve reciprocates, the oil will be spread between the surface 14 and the lower surface of the valve, capillary attraction causing it to also spread over the surface between the slide valve and the guide strips 15. The oil will also creep from the well over the bearing surface on the slide valve for the block 25 and between the valve block and the guide flanges 23 and 24, and will reach the bearing surfaces between the crank pin and the block.

With the present invention it is sought to maintain a cover over the oil well 31 at all times and thus avoid the subjection of its contents to the action of the compressed air within the bonnet which might have a tendency to force the oil from the well and drain it in a single application of the valve. With this object in view the length of the well 31 is made to correspond with the travel of the lower end of the oil supply passageway through the crank pin 27 and the block 25 is made sufficiently long to extend over and entirely cover the well in all positions of the parts. In order to avoid a projection of the block 25 beyond the seat therefor on the slide member said slide member is provided with projections to extend the length of the seat for the block and accommodate the full movement of the block thereon. By thus preventing the projection of the block beyond its seat on the slide valve it is not subjected to the possibility of a lifting action caused by the current of compressed air rising on either side of the slide valve from the ports of passageway 17. To further prevent the possibility of such a lifting effect of the inflowing compressed air upon the block 25, which would open the oil well to the pressure within the valve chamber, suitable deflector plates 37 are mounted on top of the guide strips 15 and 16 and serve to deflect the inflow of compressed air from the ports of passageway 17 away from the slide valve and cause it to follow the walls of the bonnet more closely than it would otherwise do.

By means of this invention the constantly covered oil well is protected against violent action of the compressed air within the bonnet that it would be subjected to if it were open and it is thus enabled to retain its supply of lubricant through successive applications of the valve with sufficient drainage for the purpose of lubricating the working parts without waste.

What I claim as new and desire to secure by Letters Patent is:

1. An oiling device to be associated with an engineer's valve, the combination with a valve seat, a valve adapted to slide thereon, an oil well carried by said valve, there being passageways through the valve for distributing oil from said well to the various bearing surfaces, a block slidably mounted on the valve and adapted to cover the oil well in all positions of the valve and prevent direct communication from the valve chamber thereto, and a valve stem for the valve having connection with the block for operating the valve by means thereof, there being an opening leading through the valve stem and adapted to introduce oil into the pocket.

2. In an engineer's valve, the combination with a slide valve adapted to reciprocate over a valve seat within a valve chamber, a slide block adapted to reciprocate on said valve, and an oil well carried by said valve and covered by the slide block in all positions of the valve, there being passageways for distributing oil from said well to the various bearing surfaces.

3. In an engineer's valve, the combination with a valve seat, parallel guide strips secured thereto, a valve fitting upon the valve seat and moving between the guide strips, guide flanges on the valve at right angles to the guide strips, a slide block slidably fitting on the slide valve between the guide flanges, a valve stem having a crank pin fitting within the slide block, there being a passageway leading through the valve stem and its crank pin, and an oil well on the slide valve closed by the slide block in all positions thereof and communicating with said passageway and having passageways leading to the bearing surfaces of the slide valve.

4. In an engineer's valve, the combination with a valve seat, a slide valve adapted to reciprocate over the valve seat, a slide block adapted to reciprocate upon the slide valve, a valve stem having connection with the slide block for reciprocating the slide valve by means thereof, there being an oil well in the slide valve covered by the slide block in all positions thereof with passageways leading to the bearing surfaces of the slide valve, the bearing surface on the slide valve for the slide block being extended to prevent a projection of the slide block beyond the slide valve.

5. In an engineer's valve, the combination with a valve seat, a slide valve adapted to reciprocate over the valve seat, there being compressed air supply ports in the valve seat, deflector plates for deflecting the inflow of compressed air from the slide valve, a slide block adapted to reciprocate on the slide valve, an oil well in the slide valve closed by the slide block in all positions thereof and provided with passageways leading to the bearing surfaces of the slide valve, and a valve stem for reciprocating the slide valve by means of the slide block having an oil supply passageway leading to the oil well.

6. An oiling device to be associated with an engineer's valve, the combination with a valve seat, a valve adapted to slide thereon, an oil well carried by said valve, there being passageways through the valve for distributing oil from said well to the various bearing surfaces, a block slidably mounted on the valve and adapted to cover the oil well in all positions of the valve and prevent direct communication from the valve chamber thereto, a valve stem for the valve having connection with the block for operating the valve by means thereof, there being an opening leading through the valve stem and adapted to introduce oil into the pocket, and deflector plates over the inlet ports of the valve seat for deflecting the inflow of compressed air from the valve.

7. In an engineer's valve, the combination with a slide valve adapted to reciprocate over a valve seat within a valve chamber, a slide block adapted to reciprocate on said valve, an oil well carried by said valve and covered by the slide block in all positions of the valve, there being passageways for distributing oil from said well to the various bearing surfaces, and deflector plates over the inlet ports of the valve seat for deflecting the inflow of compressed air from the slide valve.

8. In an engineer's valve, the combination with a valve seat, parallel guide strips secured thereto, a valve fitting upon the valve seat and moving between the guide strips, guide flanges on the valve at right angles to the guide strips, a slide block slidably fitting on the slide valve between the guide flanges, a valve stem having a crank pin fitting within the slide block, there being a passageway leading through the valve stem and its crank pin, an oil well on the slide valve closed by the slide block in all positions thereof and communicating with said passageway and having passageways leading to the bearing surfaces of the slide valve, and deflector plates over the inlet ports of the valve seat for deflecting the inflow of compressed air from the slide valve.

9. In an engineer's valve, the combination with a valve seat, a slide valve adapted to reciprocate over the valve seat, a slide block adapted to reciprocate upon the slide valve, a valve stem having connection with the slide block for reciprocating the slide valve by means thereof, there being an oil well in the slide valve covered by the slide block in all positions thereof with passageways leading to the bearing surfaces of the slide valve, the bearing surface on the slide valve for the slide block being extended to prevent a projection of the slide block beyond the slide valve, and deflector plates over the inlet ports of the valve seat for deflecting the inflow of compressed air from the slide valve.

10. In an engineer's valve for air brakes, a chamber under reservoir pressure, a slide valve in said chamber continually under reservoir pressure, deflector plates over the passageways to said chamber, a slide valve adapted to slide within said chamber, an oil well carried by said valve, there being passageways through the valve for distributing oil from said well to the various bearing surfaces, a block slidably mounted on the valve and adapted to cover the oil well in all positions of the valve and prevent direct communication from the valve chamber thereto, and a valve stem for the valve having connection with the block for operating the valve by means thereof.

In testimony whereof, I affix my signature, in presence of two witnesses.

WALTER J. RICHARDS.

Witnesses:
   NELLIE Z. TAUGHER,
   FRED P. COOK.